United States Patent
Hart et al.

[11] 3,944,256
[45] Mar. 16, 1976

[54] FIFTH WHEEL DOLLY

[76] Inventors: Francis Hart; Bessie M. Hart, both of 41 West 10th Ave., Mesa, Ariz. 85202

[22] Filed: July 19, 1973

[21] Appl. No.: 380,704

[52] U.S. Cl............ 280/402; 280/476 R; 280/490 R
[51] Int. Cl................................................ B62d 53/04
[58] Field of Search............ 280/402, 476 R, 425 R, 280/490

[56] References Cited
UNITED STATES PATENTS

| | | | |
|---|---|---|---|
| 2,498,779 | 2/1950 | Winchester | 280/476 X |
| 3,199,423 | 8/1965 | Dickey | 280/476 |
| 3,534,983 | 10/1970 | Alvey | 280/425 R X |
| 3,720,330 | 3/1973 | Forse et al. | 280/402 X |

*Primary Examiner*—Stanley H. Tollberg
*Assistant Examiner*—John P. Shannon
*Attorney, Agent, or Firm*—Marden Gordon

[57] ABSTRACT

The embodiment of the invention disclosed herein is directed to a detachable adapter fifth wheel dolly for connection to a fifth wheel trailer style mobile camper for transporting the camper from place to place when the standard connection associated with a pickup truck is not available. The fifth wheel dolly includes a wheeled frame member to be positioned under the forward extended portion of a fifth wheel style mobile camper. An axle and wheel means associated therewith are secured transversely of the direction of movement of the wheel frame and function to provide transport motion of the mobile camper. The power required to transport a mobile camper may be obtained by either a standard trailer type socket and hitch connection associated with an automobile or truck and connected to a trailer hitch socket associated with the fifth wheel dolly. The fifth wheel dolly includes a fifth wheel coupling member secured to the top portion of the frame readily to couple with the fifth wheel coupling associated with the mobile trailer, whereby connection of the detachable adapter fifth wheel dolly to the standard fifth wheel trailer style mobile camper allows the mobile camper to be moved from place to place with ease and convenience.

1 Claim, 4 Drawing Figures

U.S. Patent    March 16, 1976    3,944,256
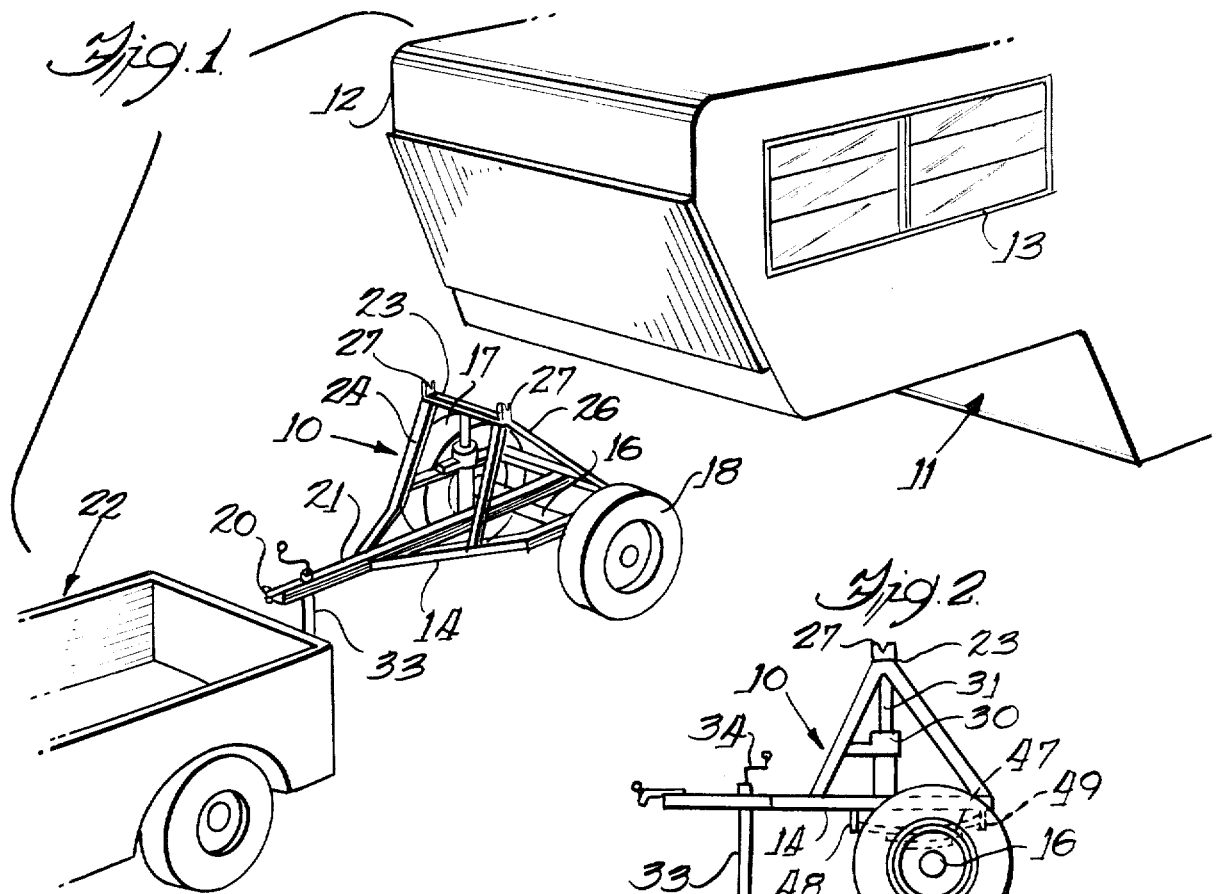
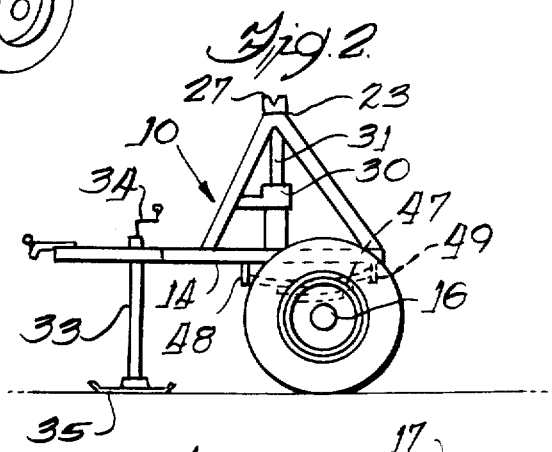
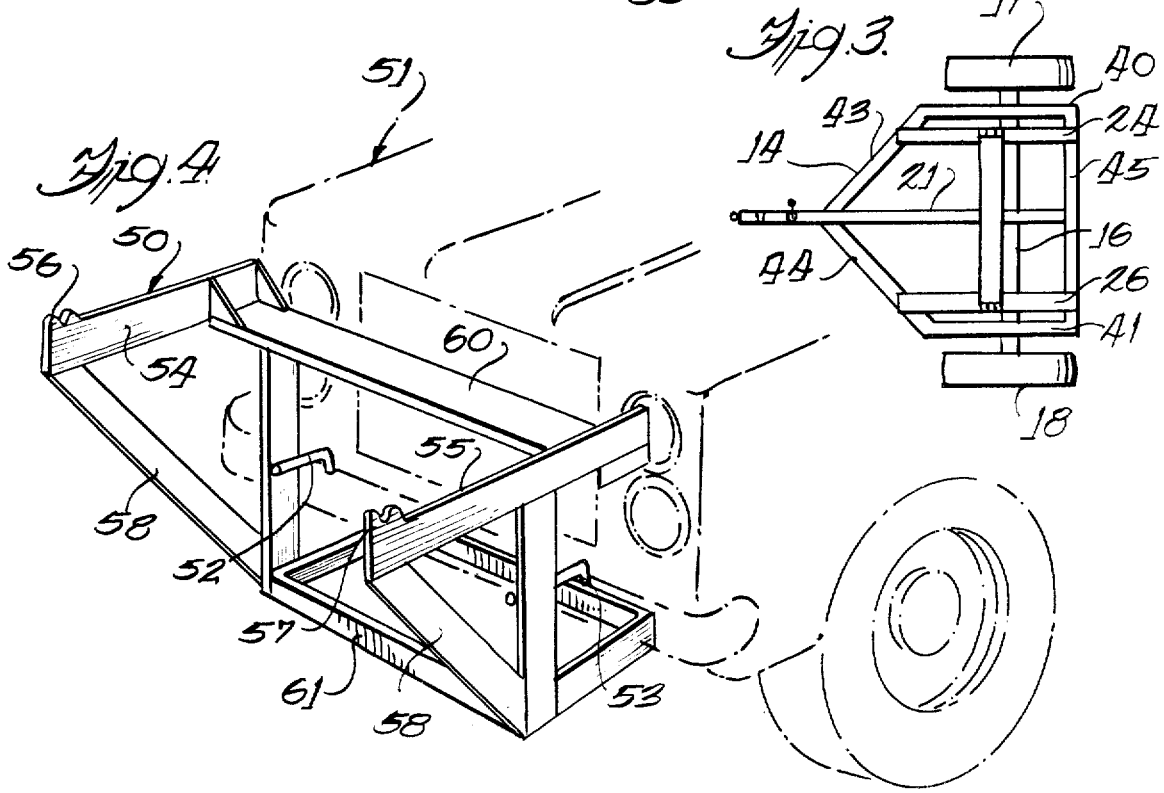

FIFTH WHEEL DOLLY

BACKGROUND OF THE INVENTION

1. Field of the Invention

This invention relates generally to improvements in structures and apparatus used primarily in the field of recreational vehicles, and more particularly to a device which functions as a detachable adapter fifth wheel dolly to provide means for connecting a set of forward wheels to fifth wheel trailer style mobile campers during transport of the campers from one site to another site. More specifically, this invention is directed to improvements in structures which enable fifth wheel type mobile campers to be transported without the need of actual connection to a fifth wheel coupling associated with a pickup truck commonly used to transport such mobile trailers. However, it will be understood that while this invention is directed particularly to devices used in the field of recreational vehicles, the specific device disclosed herein can be used in other allied fields such as trailer truck structures to be moved about in a yard of storage or the like.

2. Description of the Prior Art

Heretofore, recreational vehicles used for camping by individuals and large groups, such as families, have been relatively limited to the types of vehicles which could be used for the camping structures.

One such type of prior art recreational vehicle was the introduction of a motor home which comprised a truck with the rear portion thereof fashioned as a small mobile trailer, including living quarters such as sleeping quarters, cooking quarters, and the necessary bathroom and bathing quarters. This type of truck structure is well known in the art and is a self contained unit in that the living quarters attached thereto cannot be disconnected at any time. Therefore when persons utilizing this type of structure are camping from place to place across the countryside they are required at all times to drive this large vehicle even when they are not moving from one campsite to another campsite. For example, many times campers will select a campsite to form a base of operation, so to speak, and then go sight seeing and view the countryside therefrom. However each time they intend to leave their campsite they must also secure all loose materials within this type of camping vehicle because of the inherent hazards associated with bumps and ditches in camp areas as is well known by those who utilize such facilities.

To provide a more maneuverable type of camping vehicle of this type many mobile campers are formed of relatively small paneled trucks or small buses with a limited amount of living quarters associated therewith. While this structure is more convenient to drive around the countryside while sight seeing, it does not provide the room necessary to accomodate large families or to provide the required comfort for individuals. Therefore this type of mobile camping structure is of limited use.

Of particular interest with regard to this invention are prior art campers of the type having a fifth wheel type connection formed at a forward extended portion thereof. This type of mobile camper is arranged to be connected to a fifth wheel coupling formed on or removably fastened to the flat bed portion of a pickup truck during transport of the camper. The mobile camper is then coupled to the fifth wheel and transported from one campsite to another campsite. However, when the users of this type of mobile camping equipment would like to leave the campsite for such things as sight seeing or shopping, they merely disconnect the pickup truck from the mobile camping unit and leave it where it stands, and drive the pickup truck around the countryside. This provides a substantial savings in cost of operating the truck as gasoline and oil is not consumed as a result of having to haul the heavy load of the mobile camper.

However, while the particular pickup truck associated with the mobile camper is out on the countryside at locations displaced from where the mobile camper is positioned, it often becomes necessary to move the mobile camper from one place in a camp site to another place on the same camp site. Also, other limited movement of the mobile camper may be required for various reasons. This cannot be accomplished until such time as the associated pickup truck has returned to be coupled to the mobile camper and transport it.

SUMMARY OF THE INVENTION

Accordingly, it is a primary feature of this invention to provide a detachable adapter fifth wheel dolly for connection to fifth wheel trailer style mobile campers to enable limited transport of such campers from one site to another site wihtout the need of connecting the associated pickup truck to the camper.

Another feature of this invention is to provide a detachable adapter fifth wheel dolly which is constructed of a fabricated channel and angle irons to form a frame member upon which is positioned a structure of angularly disposed members to receive a crossbar and, which, in turn, receives the fifth wheel coupling of a mobile camper to be transported.

Still another feature of this invention is the provision of a detachable adapter fifth wheel dolly which incorporates a standard hitch socket formed at the forwardmost end portion thereof as an integral part of the wheeled frame member of the dolly so that the hitch socket can be connected to any standard size trailer ball attached to either an automobile or a truck, or any other suitable vehicle other than the standard pickup truck connection required for such mobile campers.

Still another feature of this invention is the utilization of a support frame adapted to be secured to the front portion of the motor vehicle and which extends forwardly of the motor vehicle. The support frame includes a separate independent set of fifth wheel coupling means formed as a part thereof and adapted to be fastened to a corresponding fifth wheel coupling device of a motor camper for moving the camper from one place to another place. This support frame secured to the front of a motor vehicle is also adapted to receive the wheeled frame member for carrying the frame member from one place to another place.

Briefly, the fifth wheel dolly of this invention is a device for maneuvering the fifth wheel trailer style camper when a regular fifth wheel equipped pickup truck is not available for the job. The invention is a two wheeled trailer which is equipped with the brackets for a fifth wheel attachment arranged, and which unit can be hooked behind any type of vehicle, such as car or truck which has a conventional ball hitch associated therewith. With this device, the fifth wheel trailer can be maneuvered about the yard or campsite from one location to another location without any problem. There is also a non-wheeled support member that can be attached to the front bumper of a pickup truck. This attachment is for limited use in moving or reparking a fifth wheel trailer in trailer camps or lots.

The fifth wheel dolly of this invention is intended to include the bumper bracket which could be fabricated out of channel or flat structural steel in the design specified. The framework members could be welded and/or riveted together, with a pair of leaf springs fastened at the sides of the structure and connected to the axles. An adjustable forward foot is associated with the dolly to provide height adjustment of the device. Means may be provided for adjusting the relative height of the fifth wheel coupling relative to the wheeled frame member so that a multitude of different types of fifth wheel styled mobile campers can be coupled thereto.

Many other features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective exploded view illustrating a fifth wheel style mobile camper to be transported from one site to another site and a detachable adapter fifth wheel dolly constructed in accordance with this invention connected to the rear of a truck for effecting movement of such camper;

FIG. 2 is a side elevational view of the detachable adapter fifth wheel dolly of this invention and illustrates some of the particular details of construction;

FIG. 3 is a top view of the detachable adapter fifth dolly of FIG. 2; and

FIG. 4 is a perspective view showing a support bracket which can be used as a fifth wheel coupling for effecting transport of the mobile camper and which can be used to receive and carry the wheeled frame member of the fifth wheel dolly from one site to another site.

DETAILED DESCRIPTION OF THE ILLUSTRATED EMBODIMENTS

Referring now to FIG. 1 there is seen the details of construction and use of a detachable adapter fifth wheel dolly of this invention and which is designated generally by reference numeral 10. The fifth wheel dolly 10 is shown being displaced from, but in readiness to be connected to, a mobile camping structure 11 having a fifth wheel trailer style connection formed at the underside of a forward extended portion 12 thereof which in most cases is formed to house sleeping quarters for the camping structure.

While the particular configuration of the camping structure does not in any way constitute part of this invention sufficient details thereof are discussed for purposes of providing background for the fifth wheel dolly adapter of the present invention. The mobile camper 11 includes window means 13 associated with the forward portion 12 and includes other interior structures, not herein specifically discussed, but which can be formed in any one of a plurality of different arrangements as to beds, tables, chairs and the like. This particular type of mobile camper structure is at present well known in the art.

The fifth wheel connection to this type of camper generally includes an adapter bracket to be connected to the cross braces located at the interior portion of a pickup truck, or the like. The pickup truck is then utilized as a mode of transportation when the mobile camper is moved from one site to another site. However, during storage of such mobile camper, as for example, for sale or when such campers rent a site in a camp lot, these mobile campers are often required to be moved from one site to another site within the lot. This is a cumbersome maneuver in that it requires the pickup truck to be connected to the trailer. When the pickup truck is not available the detachable adapter fifth wheel dolly of the present invention is then used to simplify this task.

The detachable adapter fifth wheel dolly 10 is constructed of a height and configuration to be readily connected to the fifth wheel trailer style mobile camper 11 with a minimum of effort. The fifth wheel dolly 10 includes a wheeled frame member 14 to be positioned under the forwardmost extending portion 12 of the mobile camper 11 for connection to the fifth wheel coupling associated therewith. The wheeled frame member includes a transversely oriented axle means 16 secured thereto by any one of a plurality of different techniques. Secured to the outermost ends of the axle means 16 are first and second wheel members 17 and 18 which are arranged to provide easy rolling when the mobile camper is to be moved. The first and second wheel members 17 and 18 are secured to the endmost portion of the axle 16 by any suitable well known means such as pins or nuts, and can be removed if necessary for changing the wheel.

Also associated with the detachable adapter fifth wheel dolly 10 is a hitch socket 20 located at the forwardmost end portion of a spine or longitudinal steel brace section 21. The hitch socket 20 is formed as an integral part of the wheeled frame and is adapted to be a size and configuration readily to fit a standard trailer ball hitch which may be associated with a motor vehicle, here being designated generally by reference numeral 22. Only the rear portion of the motor vehicle 22 is shown for purposes of illustration, it being understood that while a pickup truck is here illustrated, any other type of motor vehicle can be used without departing from the novel concepts of this invention.

The fifth wheel dolly 10 includes a fifth wheel coupling support member 23 formed at the upper end of a pair of angled support frames 24 and 26. Upwardly directed U-shaped coupling devices 27 are located at each end of the brace member 23 and are fashioned to engage correspondingly shaped fifth wheel coupling devices associated with the underside of the forward extension 12 of the mobile camper 11.

By utilizing the detachable adapter fifth wheel dolly as constructed in accordance with the principles of this invention, and connecting this dolly to a standard fifth wheel trailer style mobile camper, allows the mobile camper to be moved from one place to another place in a particular yard or campsite without the need of actually connecting the pickup truck to the mobile camper. This is accomplished by the fact that the dolly has a standard ball type hitch socket associated therewith and can be fastened to any standard type ball hitch on a car or truck, or it can be fastened to any standard type ball hitch on a car or truck, or it can be moved by hand with several people pushing the mobile camper.

Referring now to FIG. 2 the fifth wheel dolly 10 further includes height adjusting means associated with the cross brace 23 and the fifth wheel coupling device 27. This type of height adjustment may include either a screw, ratchet or hydraulic type jack device 30 associated therewith and having a portion 31 extending upwardly to effect the necessary adjustment relative to the wheeled frame member 14.

To provide an adjustment for the wheeled frame member 14 a standard 33 is also provided and includes a manually-manipulated hand crank 34 located at the upper end thereof. This manually-manipulated hand crank can be replaced by other suitable adjusting means such as a small battery operated electric motor, or the like. Also, this type of hand crank can be replaced by a small electric or hydraulic actuated pumping device to provide necessary height adjustment.

As best seen in FIG. 3 the wheeled frame member 14 includes a pair of parallel brace members 40 and 41 extending substantially parallel to the longitudinal axis of the wheels 17 and 18, respectively. The spine member 21 of the wheeled frame member is located substantially centrally of the end braces 40 and 41. A pair of angled members 43 and 44 are directed inwardly from the braces 40 and 41 and are secured, by welding or riveting or the like, to the spine 21. A rear brace member 45 completes the structure of the wheeled frame member. The upstanding angled sections 24 and 26 are then secured to the wheeled frame member as shown in FIGs. 1, 2 and 3.

As best seen in FIG. 3 the axle 16 is resiliently fastened to the wheeled frame member 14 by means of a pair of spaced apart leaf springs 47 which have the endmost portions thereof secured to the wheeled frame member 14 by depending links or brackets 48 and 49. The central portion of the leaf spring is secured to the axle 16 in a conventional manner well known to the trailer and automotive industry.

Referring now to FIG. 4 a support frame 50, constructed in accordance with the principles of this invention, is adapted to be fastened to the forward end of a motor vehicle, here designated generally by reference numeral 51, to effect both transport of the mobile camper 11 and to function as a transport device for the adapter fifth wheel dolly of this invention. Here the support frame member 50 includes a pair of hook members 52 and 53, as well as other fastening means, not here illustrated in detail, to provide rigid fastening of the support frame 50 to the forward end of the vehicle 51. The support frame 50 extends forwardly of the vehicle and includes a pair of extended arms or brackets 54 and 55 including fifth coupling notches 56 and 57 formed at the forwardmost ends thereof. These fifth wheel notches will function to couple with the fifth wheel device associated with the mobile camper 11 for transporting it from site to site if necessary. Angled depending bracket supports 58 and 59, as well as transverse bracket supports 60 and 61 form the necessary structure of the support frame 50. While the support frame 50 is here illustrated as being formed of plate and channel members, it will be understood that the structure, as well as the dolly structure 10 of this invention, can be formed of other types of structural materials and configurations, such as I-beams and pipes.

While a single specific embodiment of the present invention has been illustrated herein with great particularity it will be understood that variations and modifications may be effected without departing from the spirit and scope of the novel concepts of the invention. For example, such variations as to shape, size and arrangement of particular components may be made without detracting from the aspects of the invention as set forth in the depending claims.

Having thus described the invention, what is claimed is:

1. A detachable adapter fifth wheel dolly for connection to a conventional type coupling mounted on the forward lower portion of a conventional type of a fifth wheel trailer style mobile camper, the dolly intended for use in moving the camper from place to place about a campsite, the dolly comprising, in combination:

an open type generally rectangularly configured frame member consisting of a plurality of independent sections of channel iron having their ends interconnected together to define the frame with all of the sections lying in a single plane, the frame having a back rail, a pair of parallel side rails connected to opposite ends of the back rail and projecting forwardly therefrom, and a pair of converging forward rails disposed in a general V-shaped configuration with the base thereof connected to the forward edges of said side rails and with the apex ends thereof being connected together and lying along the longitudinal midline of said frame;

a pair of parallel transversely spaced apart longitudinally extending leaf springs, each spring secured to one of the frame side rails and extending longitudinally therealong with the ends of each leaf spring secured to the side rails by depending links associated with the side rails;

an axle assembly secured intermediate the ends of each of the leaf spring members and extending transversely of the frame parallel to the back rail thereof with the opposite ends of the axle extending outwardly from the adjacentmost side rails of the frame, the axle disposed transversely to the direction of travel of the frame;

a pair of wheels each rotatively affixed to an opposite end of said axle assembly for rotation on said axle assembly in planes parallel to said side rails when said frame member is transported from one location to another location;

a tongue channel frame member extending longitudinally along the mid line of said frame and forming an integral part thereof, the back end of the tongue member affixed centrally of said back end rail with a forward portion of said tongue member affixed to the apex of said converging forward rails with the front end of the tongue member projecting forwardly of said apex portion, said tongue member lying substantially co-planar with said frame and forming an integral part thereof;

a hitch socket formed as an integral part of said front end of said tongue member and projecting forwardly and outwardly therefrom and being of a size and configuration to readily fit a standard trailer ball hitch secured in a conventional manner to a motor vehicle for purposes of towing the frame;

an adjustable elongated standard secured to said tongue member intermediate said apex of said converging forward rails and said hitch socket, said standard extending normal to the axis of said tongue member and passing therethrough and affixed thereto with a portion of said standard projecting above said tongue member with the major portion of said standard extending below said tongue member in a generally vertical direction the bottom end of the standard having an associated flat foot portion affixed thereto and adapted to engage the ground surface for supporting the forward end of said frame when not hitched to a towing vehicle, said standard adjustable by an adjusting means including a hand crank for manual manipulation of said standard between a position where the foot portion engages the ground and the frame is supported in a substantially horizontal plane, and a retracted position wherein the foot portion is raised from the ground with the hitch socket affixed to a towing vehicle such that the standard does not interfere with the towing of the frame by the vehicle;

a pair of transversely spaced apart longitudinally extending inverted V-shaped angle members each lying in a vertical plane parallel to the side rails with each angle member disposed adjacent and inwardly of an associated one of said side rails and projecting upwardly therefrom with the ends of each of the angle members extending between the back rail and an end portion of the adjacent associated forward rail;

the apex portion of each of the angle members being in transverse alignment parallel to said axle assembly and disposed forwardly of said axle assembly;

a cross brace extending transversely of said frame with its opposite end portions resting on said apex portions of said angle members;

coupling means secured to said cross brace and adapted to detachably engage the coupling of the mobile camper for the towing of the same;

adjusting means for adjusting the height of said coupling means relative to said frame to enable said dolly to be adapted to fit a wide multitude of different types and styles of fifth wheel trailer style mobile campers and properly engage the dolly coupling means with the camper coupling;

whereby, connection of said dolly coupling means to said fifth wheel trailer style mobile camper coupling allows the mobile camper to be moved and transported from place to place by a vehicle having a conventional standard trailer ball hitch affixed thereto and thus eliminating the need of a pickup style truck having a fifth wheel connection mounted in the bed thereof.

* * * * *